Figure 1:
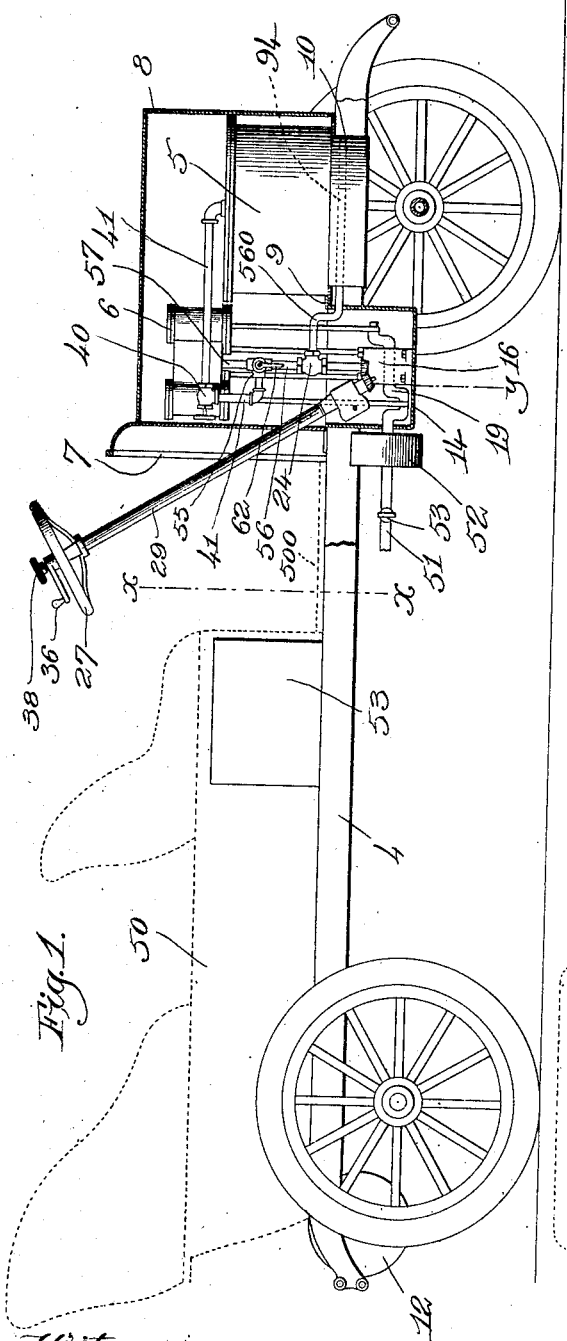

L. S. ROSS.
MOTOR VEHICLE.
APPLICATION FILED JULY 24, 1906.

926,290.

Patented June 29, 1909.
2 SHEETS—SHEET 1.

Witnesses.
Thomas J. Drummond
William Priary

Inventor.
Louis S. Ross,
by Crosby Gregory Attys.

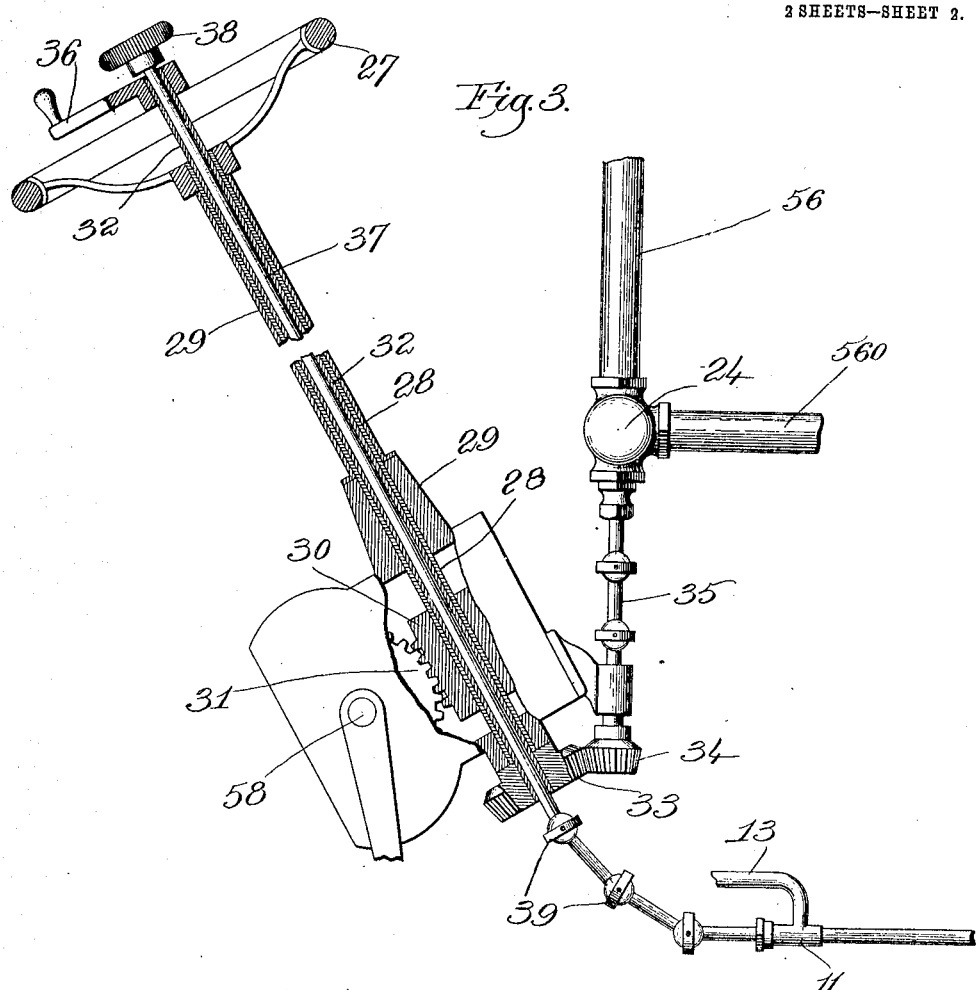

UNITED STATES PATENT OFFICE.

LOUIS S. ROSS, OF NEWTON, MASSACHUSETTS.

MOTOR-VEHICLE.

No. 926,290.      Specification of Letters Patent.      Patented June 29, 1909.

Application filed July 24, 1906. Serial No. 327,529.

*To all whom it may concern:*

Be it known that I, LOUIS S. Ross, a citizen of the United States, and a resident of Newton, in the county of Middlesex and State of Massachusetts, have invented an Improvement in Motor-Vehicles, of which the following description, in connection with the accompanying drawing, is a specification, like numerals on the drawing representing like parts.

This invention relates to motor vehicles and especially to steam driven motor vehicles, and it has for its object to provide a novel way of mounting both the steam generator and the engine.

According to my invention both the engine and the steam generator are supported directly on the chassis, at the front end thereof, and in front of the dash-board, said engine and generator being inclosed in a suitable casing which is independent from the body of the vehicle.

A construction embodying my invention will first be described and then the novel features will be pointed out in the claims.

Figure 2:
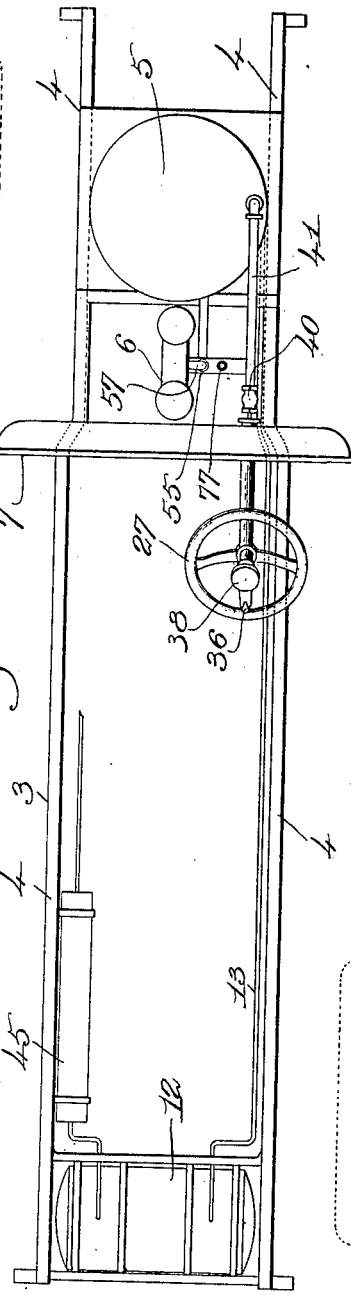

Referring now to the drawings, Figure 1 is a side view of the chassis of an automobile embodying my invention; Fig. 2 is a top plan view thereof; Fig. 3 is a detailed view of the means for operating the steering gear, the throttle and the burner valve; Fig. 4 is a section on the line $x$—$x$, Fig. 1; Fig. 5 is a section on the line $y$—$y$, Fig. 1.

The chassis is designed generally by 3, and is herein shown as comprising the two side sills 4, which are properly connected together in any suitable way.

5 designates the steam generator and 6 the engine. These parts may be of any suitable or usual construction and form no part of my present invention, part of which relates to the manner of mounting the steam generator and engine upon the chassis and their relation to the other parts of the apparatus.

Both the steam generator and the engine are situated at the front end of the chassis and entirely in front of the dashboard which is designated by 7. This dashboard is entirely separate from the body of the automobile and is made rigid with the chassis. This dashboard, with the hood 8, constitutes the casing which incloses the steam generator and the engine. The hood 8 may be of any suitable pattern, and is preferably made detachable from the chassis so that by removing it the various parts of the engine and boiler are made accessible.

The body of the automobile is designated by 50 and it has a platform 500 and is shown in Fig. 1 in dotted lines. It is removably sustained by the chassis in any suitable way, and is entirely independent from the dashboard. As a result the body may be removed from the chassis, and when this is done the parts shown in full lines, Fig. 1, remain. It will be noted that the body is entirely independent and separated from the casing which incloses the motor and steam generator, and, therefore, the removing of the body does not in any way affect the operation of the automobile.

Both the steam generator and the engine are supported on a suitable flooring 9 which is preferably of sheet metal and which extends across the chassis from one sill to the other and from the dashboard 7 forwardly a sufficient distance to support these parts. The flooring is provided with an opening beneath the steam generator 5, the diameter of said opening being slightly less than that of the steam generator. Beneath the steam generator is a burner of any suitable construction which is inclosed in a casing 10 that extends through the opening in the flooring 9 and is herein shown as occupying a position beneath said flooring.

11 designates a burner valve of any suitable construction by which the supply of gasolene or other fuel to the burner is controlled. The gasolene is contained in a tank 12 situated at the rear end of the chassis, and said tank is connected with the burner valve 11 by means of a suitable pipe 13.

The engine is herein shown as being supported on uprights or pillars 15 which are supported at their lower ends on a block 16. This block 16 is supported by the dropped portion 14 of the flooring, this dropped portion extending some distance below the side sills of the chassis, as best seen in Figs. 1 and 5.

19 designates the crank shaft of the engine which is shown as journaled in the block 16. This crank shaft has fast thereon a flywheel 52, and is connected to the driving shaft 51 by means of a universal joint 53. The driving shaft 51 extends back to the differential driving gear, which may be of any suitable or usual construction.

By making the floor with the dropped portion 14 the crank shaft of the engine is located sufficiently below the side sills of the chassis so that it may be connected directly to the driving shaft 51, as best seen in Fig. 1.

The steam is taken from the boiler by a pipe 41, and in the present embodiment of my invention said pipe 41 leads to a cut-out valve or device 55, and the latter is connected to a throttle valve 24 by means of a pipe 56. The throttle valve may have any suitable or usual construction, and it is arranged to be operated by a handle associated with the steering wheel, as will be presently described. Extending from the throttle is a pipe 560 which leads to a superheater 94 of some suitable construction that is sustained within the casing 10 and above the burner as usual, and from the superheater the steam is taken to the steam chest of the engine 6 by a suitable pipe 57.

The steering wheel is designated by 27 and it is mounted on the stem or shaft 28 which extends through a sleeve 29 projecting upwardly in an inclined direction from the dashboard 7 and which extends at its lower end through the dashboard. The shaft 28 has thereon at its lower end a worm 30 which meshes with a worm gear 31 that is mounted on a crank shaft 58, from which extends some usual connection to the steering wheels. The shaft 28 is hollow and within said shaft extends another hollow shaft 32 which has at its lower end a bevel gear 33 meshing with the bevel 34 on the stem 35 of the throttle valve 24. The hollow shaft 32 has at its upper end a crank or handle 36 by which it may be manipulated. With this construction, it will be observed that the throttle of the engine may be opened by means associated with and adjacent to the steering wheel 27. Within the hollow shaft 32 is another shaft 37 which is connected to the stem of the burner valve 11, said shaft preferably having one or more universal joints 39 therein, to permit it to operate easily. The upper end of the shaft 37 extends beyond the handle 36 and is provided with a hand piece 38.

With this construction, it will be seen that both the burner valve and the throttle valve can be readily manipulated without necessitating any change of position by the chauffeur and without removing his hands from the steering wheel. If desired, a supplemental throttle valve 40 may be employed in the pipe 41 which connects the steam generator 5 with the superheater. Under ordinary conditions, however, the supplemental throttle valve 40 need not be used at all, as the supply of steam may be controlled through the regular throttle valve 24.

While I have illustrated herein one embodiment of my invention I do not wish to be limited to all the details of the construction shown.

45 designates an air tank which is connected to the gasolene tank 12 by a suitable pipe and which is also connected to an air pump (not shown) by means of a pipe, said air tank being for the purpose of maintaining the desired pressure in the gasolene tank 12.

53 designates a water tank from which a supply of water is maintained in the boiler by any usual pump mechanism, not shown.

The dashboard 7 may have thereon suitable gages 43 and 44 to indicate the steam pressure in the boiler and also the pressure in the air tank 45.

46 and 47 designate handles by which the usual valves controlling the usual air pump for maintaining a supply of air under pressure in the air tank 46 and the usual water pump for feeding water to the boiler (neither of which pumps are shown) may be operated.

Having thus fully described my invention, what I claim as new, and desire to secure by Letters Patent is:—

1. The combination with the chassis and body of a motor vehicle, of a casing supported by the chassis forward of the body and a steam generator and an engine, both within said casing, said steam generator and engine both being supported by the chassis.

2. In a motor vehicle, a chassis having rigid therewith a dashboard, a vehicle body at the rear of the dashboard and independent therefrom and a steam generator and an engine, both supported by the chassis in front of the dashboard.

3. In a motor vehicle, a chassis, a steam generator and an engine supported thereby at the front end thereof, a casing inclosing both said steam generator and engine, the rear end of said casing constituting the dashboard, and a body independent from the dashboard and removably mounted on the chassis.

4. In a motor vehicle, a chassis, a casing at the forward end of the chassis, a steam generator and an engine, both arranged within said casing, and both sustained by the chassis, a burner below the steam generator, a body independent from the casing and provided with a seat, and devices for controlling the supply of burning mixture accessible from the seat.

5. In a motor vehicle, a chassis, a body, seat and platform carried by the body, a steam generator, a burner and an engine, all carried by the chassis in front of the body, and means accessible from the seat of the body for regulating the supply of fuel to the burner and the supply of steam to the engine.

6. In a motor vehicle, a chassis, comprising two longitudinal side sills, a flooring supported by said side sills at the front end thereof, a steam generator and an engine both supported by said flooring, and a body comprising a seat and a platform in the rear of the engine and steam generator.

7. In a motor vehicle, a chassis, comprising longitudinal side sills, a body supported by said chassis, a dashboard in front of the body independent therefrom and secured to the chassis, a sheet metal flooring in front of the dashboard supported by the side sills, and a steam generator and an engine supported by said sheet metal flooring.

8. In a motor vehicle, a chassis, comprising longitudinal side sills, a flooring supported thereby, said flooring having an aperture and a dropped portion, a steam generator supported by the flooring over the aperture, a burner beneath the flooring and extending through the aperture, and a steam engine supported by the dropped portion of the floor.

In testimony whereof, I have signed my name to this specification, in the presence of two subscribing witnesses.

LOUIS S. ROSS.

Witnesses:
MARGARET A. DUNN,
ELIZABETH R. MORRISON.